United States Patent [19]

Sonobe

[11] Patent Number: 4,908,722
[45] Date of Patent: Mar. 13, 1990

[54] DIGITAL MAGNETIC RECORDING/REPRODUCTION APPARATUS AND METHOD

[75] Inventor: Yoshiaki Sonobe, Yokohama, Japan

[73] Assignee: Kabushiki Kaisha Toshiba, Kawasaki, Japan

[21] Appl. No.: 214,584

[22] Filed: Jul. 1, 1988

[30] Foreign Application Priority Data

Jul. 3, 1987 [JP] Japan .................................. 62-166688

[51] Int. Cl.$^4$ .......................... G11B 5/09; G11B 15/14
[52] U.S. Cl. ........................................ 360/46; 360/65
[58] Field of Search ...................... 360/31, 46, 65, 67, 360/68

[56] References Cited

U.S. PATENT DOCUMENTS

| | | | |
|---|---|---|---|
| 4,296,445 | 10/1981 | Schowe, Jr. | 360/65 |
| 4,422,109 | 12/1983 | Sampei et al. | 360/65 |
| 4,580,176 | 4/1986 | Graves et al. | 360/65 |

FOREIGN PATENT DOCUMENTS

60-113302  6/1985  Japan .
60-143404  7/1985  Japan .

*Primary Examiner*—Vincent P. Canney
*Attorney, Agent, or Firm*—Oblon, Spivak, McClelland, Maier & Neustadt

[57] ABSTRACT

A digital magnetic recording/reproduction apparatus and method for recording and reproducing a digital information signal. The apparatus comprises a magnetic head, a recording system means for recording the digital information signal and a calibration signal with a specific digital pattern in a magnetic recording medium, through the same signal path, a reproduction system for reproducing the recorded digital information signal and the recorded calibration signal, through the same signal path, and for outputting a reproduced signal, a waveform equalizer for equalizing a waveform of the reproduced signal, a data discriminator for discriminating a data signal from the signal output from the waveform equalizer, by using a window signal, and a calibration system for controlling a characteristic of the waveform equalizer and/or the recording current supplied to the magnetic head so as to maximize a window margin of the data discriminating circuit.

14 Claims, 5 Drawing Sheets

DIGITAL MAGNETIC RECORDING/REPRODUCTION APPARATUS AND METHOD

BACKGROUND OF THE INVENTION

1. Field of the Invention

This invention relates to a digital magnetic recording/reproduction apparatus and method for handling digital information signals and, more particularly, to a magnetic recording/reproduction system with a calibration system for widening a window margin used for data discrimination.

2. Description of the Related Art

Compact data processing apparatuses such as personal computers and word processors generally use a floppy disk drive (FDD) as an external memory device. It is desired that the floppy disk for use in such data processing apparatuses have a greater memory capacity. There are two measure to increase the memory capacity of the floppy disk. One is to increase the track density of the recording medium, the other being to increase the medium's bit density. In the FDD, to increase the track density, the FDD will inevitably encounter a limit in the improvement of a mechanical accuracy of the recording medium and a positioning accuracy of the magnetic head. In this respect, the increase of the bit density is desired. In the magnetic recording/reproduction apparatus, such as the FDD, handling the digital information signal when the bit density of the floppy disk is increased, a peak shift of the information signal reproduced from the disk increases, so that a window margin for data discrimination decreases. When the reproduced digital information signal is discriminated by the window signal, the peak shift possibly results in a deviation of the data, contained in the reproduced signal, from the window signal on the time axis. If this data deviation — which is known as a bit deviation, — occurs, this gives rise to a data discrimination error. The window margin means the time margin defined by a difference between the data deviation and the pulse width of the window signal. If the window margin is narrow, the data discrimination error may easily occur. The window margin varies depending not only on the peak shift, but also a spacing between the recording medium and the magnetic head, recording current, the characteristic of the recording medium, and saturation of the magnetic head.

Figure 7:
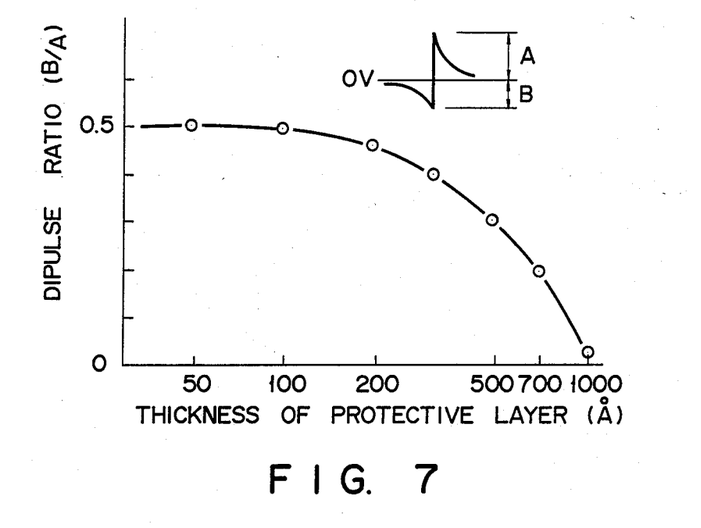
FIG. 7 shows a graph depicting a relationship between a dipulse ratio of the reproduced isolated wave signal and the thickness of the protective layer of a recording medium, the illustration being useful in explaining the problems of the prior art.

Turning now to FIG. 7, this figure shows a characteristic curve representing the relationship between a dipulse ratio (B/A) and the thickness of a protective layer of the recording medium. This curve was plotted by recording and reproducing an isolated wave signal by use of a digital magnetic recording/reproduction apparatus incorporating a perpendicular magnetic recording medium and a ring type magnetic head. As can be seen from FIG. 7, the dipulse ratio represents a ratio of the amplitude (B) of a negative pulse in the reproduced isolated wave signal to that (A) of the positive pulse. The perpendicular magnetic recording medium was a floppy disk structured so as to have a Co-Cr thin film, covered with a protective layer, formed on a flexible substrate. The diameter of the flexible substrate was 3.5 inches, the Co-Cr film had a perpendicular magnetic anisotropy, being 970 Oe in coercivity (Hc) and 440 G in saturation magnetization (Ms), and the surface of the protective layer was lubricated. The magnetic head was an Mn-Zn ferrite head having a gap length of 0.31 $\mu$m.

Figure 8:
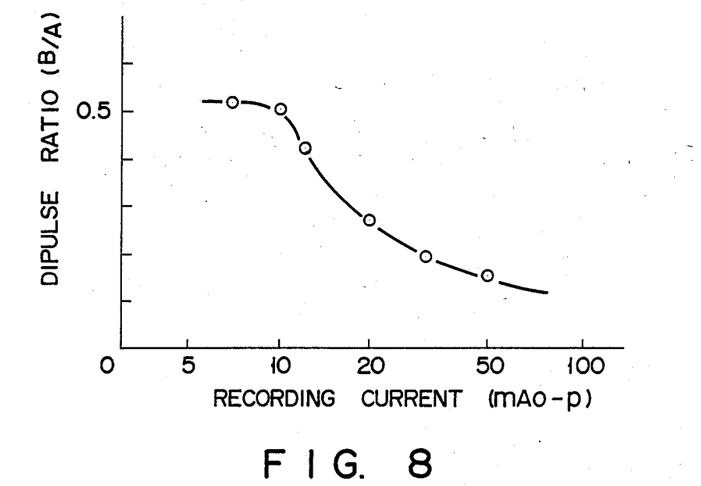
FIG. 8 shows a graph depicting a relationship between a recording current and a dipulse ratio, the illustration being used for the same purpose as that of the FIG. 7 illustration.

In FIG. 7, the dipulse ratio was measured in varying the thickness of the protective layer. The characteristic curve shown in FIG. 8 represents a relationship between a recording current fed to the magnetic head and the dipulse ratio of the reproduced signal. In the case of FIG. 8, the dipulse ratio was measured by varying the recording current, while the thickness of the protective layer is fixed to 200 Å.

As can be seen from FIGS. 7 and 8, when the thickness of the protective layer, which is equal to an effective spacing between the recording medium and the magnetic head, and the recording current increases, the dipulse ratio of the reproduced signal waveform steeply decreases. As a result, a longitudinal waveform component contained in the reproduced signal waveform having the longitudinal component and a perpendicular components, is increased. The increase in the thickness of the protective layer and the increase of the recording current cause the recording magnetization mode to change from a perpendicular mode to a longitudinal mode. As a result of this change in mode, the waveform of the reproduced signal also changes.

The recording magnetization mode also changes depending on the spacing between the head and the recording medium which changes, a change in the recording current due to characteristics of the recording media used, or the difference in recording magnetic field intensity due to the difference in characteristic between the magnetic heads used. When the reproduced signal waveform changes in accordance with the recording magnetization mode, the peak shift changes, and hence the window margin changes. Therefore, the change of the recording magnetization mode gives but an insufficient window margin, and possibly causes a data discrimination error.

In an apparatus using a longitudinal magnetic recording medium, increase of the recording current changes the pulse width of the reproduced signal waveform. Also in this case, the window margin reduces, and the same problem occurs.

In actual use of the FDD, it is frequently required to secure a compatibility of the upper-grade device with the lower-grade device. For example, when the upper-grade device is designed to use the perpendicular magnetic recording medium, while the lower-grade device is designed to use the longitudinal magnetic recording medium, it is desirable that the higher-grade device handle both types of the recording media. The conventional recording/reproduction apparatus can handle, only the perpendicular recording medium or the longitudinal recording medium. If one tries to use for a magnetic recording/reproduction apparatus a recording medium different from that originally used, the window margin is remarkably decreased, rendering the use of the recording medium impractical.

SUMMARY OF THE INVENTION

Accordingly, an object of this invention is to provide a digital magnetic recording/reproduction apparatus and method almost free from a data discrimination error due to the head touch difference, variability of the characteristics of the recording media, variability of the magnetic heads, and the difference of the types of the recording media.

According to this invention, there is provided a digital magnetic recording/reproduction apparatus for recording and reproducing a digital information signal, comprising: means for recording the digital information signal and a calibration signal with a specific digital pattern in a magnetic recording medium, through the same signal path; means for reproducing the recorded digital information signal and the recorded calibration signal through the same signal path, and for outputting a reproduced signal; means for equalizing a waveform of the reproduced signal; data discriminating means for discriminating a data signal from the output signal of the waveform equalizing means by using a window signal; and controlling means for controlling the characteristic of the waveform equalizing means and/or the recording current supplied to a magnetic head, so as to maximize a window margin of the data discriminating means, on the basis of at least one of the reproduced signal and the data signal corresponding to the calibration signal.

The waveform equalizing means includes a filter means for Hilbert transforming the reproduced signal, for example, a multiplying means for multiplying the reproduced signal by a coefficient, and a means for combining the output signal of the multiplying means and the output signal of the filter means. The controlling means controls the coefficient, for example, in a mode to control the characteristic of the waveform equalizing means.

When the digital magnetic recording/reproduction apparatus uses ring type magnetic heads for the recording and reproducing purposes, the reproduced signal is generally a composite signal having the perpendicular waveform component and the longitudinal waveform component. In this case, the apparatus uses a means for measuring a ratio of the longitudinal waveform component and the perpendicular waveform component as contained in the reproduced signal corresponding to the calibration signal. The ratio measured is supplied as the coefficient to the multiplying means. That ratio is obtained from a characteristic of the relationship between the longitudinal-to-perpendicular waveform component ratio and a dipulse ratio, and a dipulse ratio of the reproduced signal corresponding to the calibration signal.

In the recording current control mode, the controlling means controls the recording current so as to minimize a difference between a prestored dipulse ratio providing a maximum window margin, and a dipulse ratio of the reproduced signal corresponding the calibration signal.

According to another embodiment of this invention, the controlling means directly measures the window margin from the data signal corresponding to the calibration signal, and controls the characteristic of the waveform equalizing means and/or the recording current, so as to maximize the measured window margin.

Since a digital pattern of the calibration signal is known, the waveform of the reproduced signal and the data signal, which correspond to the calibration signal, reflects a characteristic variation of the recording system due to the head touch difference, characteristic variation of the recording medium, variability of the used magnetic heads, and the difference of the types of the recording medium, and the like. The characteristic variation of the recording system appears in the form of a change of the window margin. When the combination of a perpendicular magnetic recording medium and a ring type magnetic head is used for reproducing the information signal, it also appears as a change of the longitudinal-to-perpendicular waveform component ratio.

According to this invention, a window margin is indirectly seized by measuring a longitudinal-to-perpendicular waveform ratio of the reproduced signal corresponding to a calibration signal, or the window margin is directly measured from the data signal corresponding to the calibration signal. Then, the characteristic of the waveform equalizing means and/or the recording current are controlled so as to maximize the window margin. Therefore, the magnetic recording/reproduction apparatus is insensitive to the data discrimination error due to the characteristic variation of the recording/reproduction system.

This invention is effectively used, particularly when the combination of a perpendicular magnetic recording medium and a ring type magnetic head is used. Further, the recording/reproduction apparatus according to this invention can use any of the longitudinal, perpendicular and nonorientation magnetic recording media, in the same device. Therefore, when the magnetic recording/reproduction apparatus is applied to the upper and lower grade apparatuses using different types of recording media with different recording magnetization modes, these apparatuses may be made compatible with each other.

DETAILED DESCRIPTION OF THE PREFERRED EMBODIMENTS

Figure 1:
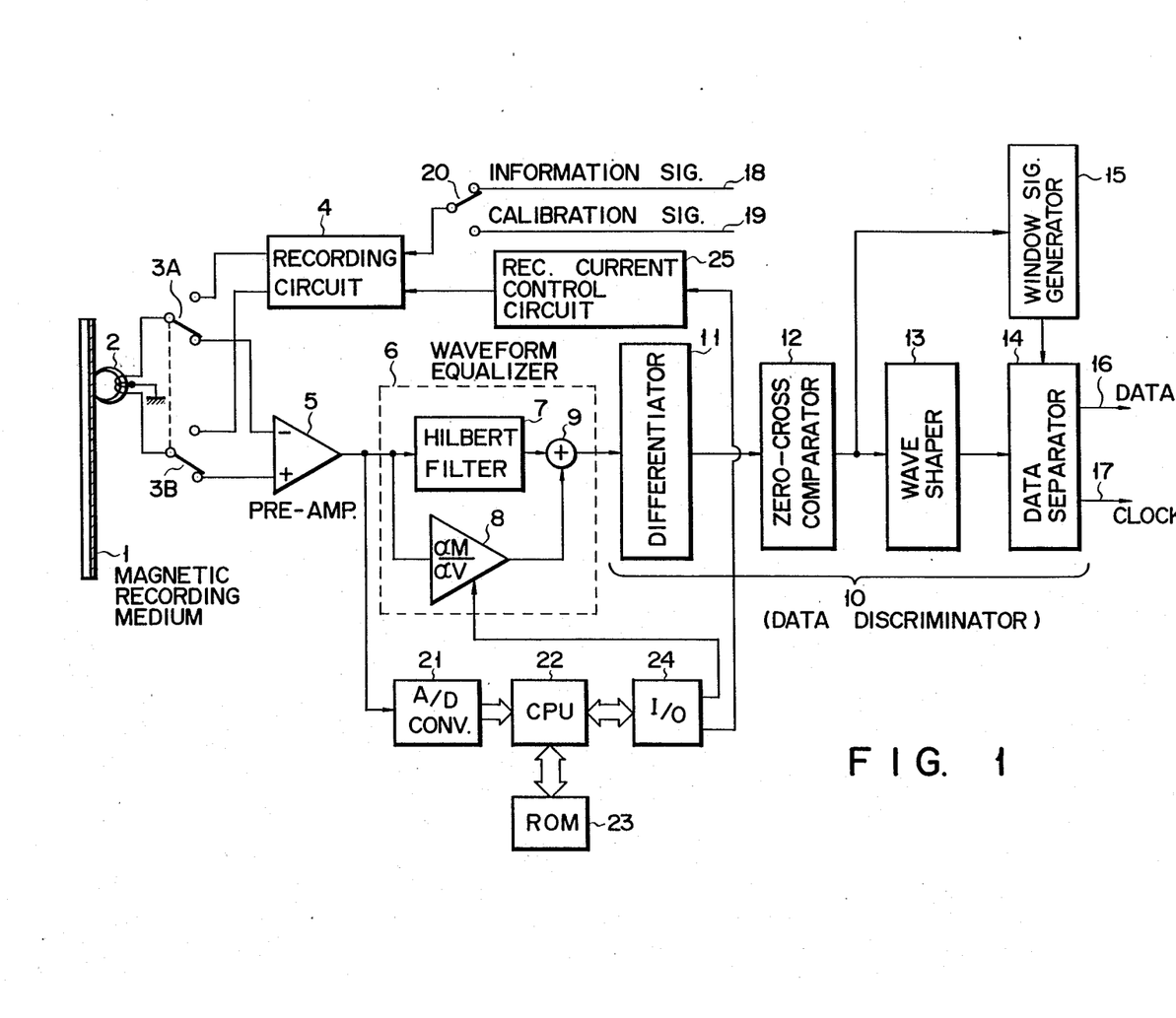
FIG. 1 shows a block diagram of a digital magnetic recording/reproduction apparatus according to a first embodiment of this invention.

In FIG. 1, magnetic recording medium 1 is a floppy disk. The floppy disk has such a structure that a magnetic layer as a Co-Cr thin film is layered on a flexible substrate, for example. The magnetic layer is 0.4 $\mu$m in thickness ($\delta$), 970 Oe in the perpendicular coercivity (Hc), and 440 G in saturation magnetization (Ms). A protective layer as an SiO$_2$ film of 200 Å thick is further formed on the magnetic layer. Lubrication is applied to the surface of the protective layer. Magnetic head 2 is a ring type magnetic head constructed with an Mn-Zn ferrite head with a gap length of 0.31 $\mu$m, for example. Recording/reproduction select switches 3A and 3B are used when either of a recording mode or a reproduction mode is selected. In the recording mode, these switches connect magnetic head 2 to recording circuit 4 to feed a recording current to magnetic head 2. In the reproduction mode, the switches connect magnetic head 2 to pre-amplifier 5 for amplifying a signal as reproduced by magnetic head 2.

The reproduced signal as amplified by pre-amplifier 5 is applied to waveform equalizer 6. Waveform equalizer 6 is made up of Hilbert filter 7, coefficient multiplier 8, and adder 9. The waveform equalizer 6 equalizes a waveform of the reproduced signal as a composite waveform having the longitudinal and perpendicular waveform components, to transform it into a longitudinal waveform. This waveform processing is made for making the data discrimination easy.

It has been known that in the apparatus for recording and reproduction an information signal by the combination of perpendicular magnetic recording medium 1 and ring type magnetic head 2, a waveform of the reproduced signal is a composite waveform having the longitudinal and perpendicular waveform components. Assuming that the longitudinal and perpendicular waveform components are mathematically expressed by $a_M f_M + a_V f_V$ where $f_M$ indicates a longitudinal waveform component and $f_V$ a perpendicular waveform components, Hilbert filter 7 transforms this waveform into a waveform expressed by $a_V f_M - a_M f_V$. This waveform transformation is called a Hilbert transformation. Coefficient multiplier 8 multiplies this longitudinal/perpendicular composite waveform $a_M f_M + a_V f_V$ by a coefficient as a ratio $a_M/a_V$ of the longitudinal waveform component to the perpendicular waveform components of the composite waveform, thereby to obtain a waveform as given by $(a_M^2 \times f_M/a_V) + a_M f_V$. Adder 9 sums the output signals of Hilbert filter 7 and coefficient multiplier 8, and produces a waveform $a_V(1 + a_M^2/a_V^2)f_M$, which indicates the longitudinal waveform component.

The output signal of waveform equalizer 6 is supplied to data discriminator 10. Data discriminator 10 is composed of differentiator 11, zero-cross comparator 12, wave shaper 13, and data separator 14. Differentiator 11 differentiates the output signal of waveform equalizer 6. Zero-cross comparator 12 converts the output signal of differentiator 11 into a binary signal. Wave shaper 13 shapes the waveform of the signal output from comparator 12 into a waveform of a perfectly binary signal. Data separator 14 discriminates the window signal output from wave shaper 13, by using a window signal supplied from window signal generator 15, and separates the discriminated signal into data signal 16 and clock signal 17. Window signal generator 15 includes, for example, a PLL (phase-locked loop) circuit which extracts the clock-signal component from the output signal of comparator 12, and generates the window signal from the extracted clock-signal component. It has been known that such a data discriminator 10 using the differentiation provides the maximum window margin when the waveform of the input signal consists of the longitudinal waveform component alone, viz., without containing the perpendicular waveform component.

Digital information signal 18 and calibration signal 19 containing a specific digital pattern are selectively supplied to recording circuit 4, via mode select switch 20.

The reproduced signal output from pre-amplifier 5 is also applied to A/D converter 21, where it is converted into a digital signal consisting of a proper number of bits. The output signal of A/D converter 21 is inputted to CPU (central processing unit) 22. CPU 22 computes a dipulse ratio of the reproduced signal amounting to the calibration signal, and measures the longitudinal-to-perpendicular waveform component ratio from the dipulse ratio, while referring to the contents of ROM (read only memory) 23. Further, CPU 22 controls the characteristics of waveform equalizer 6 according to the longitudinal-to-perpendicular waveform component ratio as measured, and controls the recording current fed to magnetic head 2 from recording circuit 4. In this way, CPU 22 prepares the coefficient data representing a proper value, which is to be multiplied by the reproduced signal in coefficient multiplier 8, and additionally the recording current control data. The coefficient data is supplied to coefficient multiplier 8 via I/O (input/output) port 24. The recording current control data is transferred through I/O port 24 to recording current control circuit 25.

Figure 2:
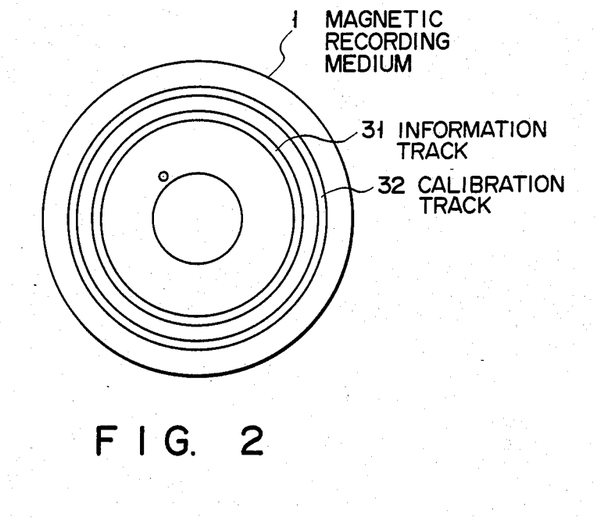
FIG. 2 shows a plan view of a magnetic recording medium used in the FIG. 1 apparatus illustrating a layout of an information track and a calibration track.

As shown in FIG. 2, magnetic recording medium 1 contains information track 31 for recording digital information signal 18 and calibration track 32 for recording calibration signal 19, which is used for measuring a characteristic of the recording/reproduction system. Calibration track 32 is located along the outer periphery of information track 31. Calibration signal 19 having an NRZ-I (non return to zero-inverse) pattern of all "1"s', for example, is recorded in calibration track 32 at a density of 1 kBPI.

Figure 3:
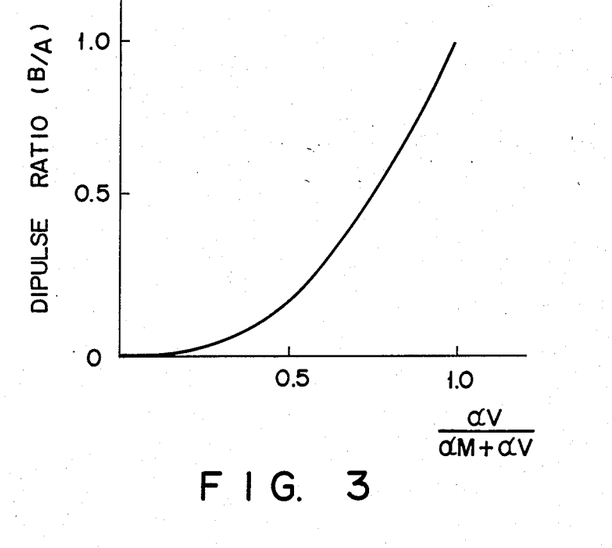
FIG. 3 shows a graph illustrating a relationship between a ratio of the longitudinal waveform component to the longitudinal/perpendicular composite waveform stored in a ROM of the FIG. 1 circuit, and a dipulse ratio.

In a reproduction mode, the calibrating operation follows the reproduction of a digital information signal from track 31. Therefore, a calibration signal must first be reproduced from track 32. A reproduced signal corresponding to a calibration signal, which is reproduced from track 32, is inputted to A/D converter 21 via pre-amplifier 5. In turn, A/D converter 21 converts the reproduced signal into parallel digital signals of about 8 bits, and transfers them to CPU 22. ROM 23 stores a relationship between the dipulse ratio (B/A) and the longitudinal-to-perpendicular waveform component ratio $a_M/a_V$. This relationship is obtained from a relationship of the dipulse ratio and a ratio $a_V/(a_M + a_V)$ of the perpendicular waveform component to the longitudinal/perpendicular composite waveform (FIG. 3). A characteristic curve plotted in FIG. 3 is obtained about a longitudinal/perpendicular composite waveform containing a longitudinal waveform approximated by a Lorentz waveform and a perpendicular waveform as obtained by Hilbert transforming the Lorentz waveform. CPU 22 computes a dipulse ratio of the reproduced signal corresponding to the calibration signal, and computes the longitudinal-to-perpendicular waveform component ratio $a_M/a_V$ of the reproduced signal from the characteristic of FIG. 3. A value of the longitudinal-to-perpendicular waveform component ratio $a_M/a_V$ is transferred as coefficient data through I/O port 24 to the coefficient multiplier 8 in waveform equalizer 6. Finally, the waveform equalizer 6 is calibrated.

Figure 4:
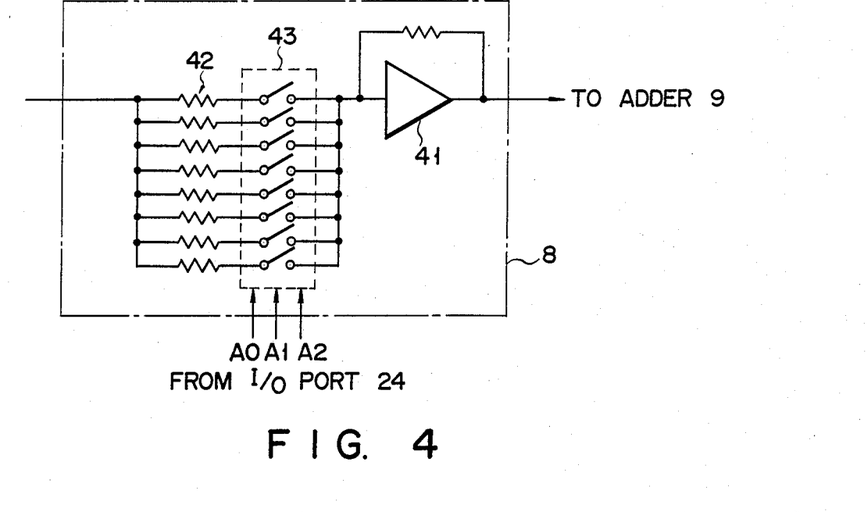
FIG. 4 shows a circuit diagram showing an arrangement of a coefficient multiplier in the FIG. 1 circuit.

Coefficient multiplier 8, as shown in FIG. 4, is composed of amplifier 41, a plurality (eight in this instance) of gain determining resistors 42, and analog switch circuit 43 for selecting these resistors 42. The coefficient data prepared by CPU 22 is transferred in the form of 3-bit parallel data A0, A1 and A2 to analog switch circuit 43 by way of input/output port 24. Analog switch circuit 43 selects resistors 43 according to data A0, A1 and A2, so that a gain (i.e., coefficient) amounting to the longitudinal-to-perpendicular waveform component ratio $a_M/a_V$ is produced by coefficient multiplier 8.

If the same combination of magnetic recording medium 1 and magnetic head 2 is used, the equal longitudinal-to-perpendicular waveform component ratio $a_M/a_V$ of the reproduced signal exists in both the cases that the digital information signal is reproduced from information track 31 and that the calibration signal is reproduced from calibration track 32. Therefore, after waveform equalizer 6 is calibrated by setting the longitudinal-to-perpendicular waveform component ratio of the reproduced signal corresponding to the calibration signal, the coefficient is optimum even when the digital information signal is reproduced. As a result, waveform equalizer 6 produces an output signal consisting of the longitudinal waveform component alone. Accordingly, in data discriminator 10, a window margin is large, which is used when a reproduced signal corresponding to a digital information signal is discriminated. This indicates that an error in data signal 16 is reduced.

A calibration test of waveform equalizer 6 was conducted by using three types of magnetic recording media 1, which are different in the thickness of the protective film, 200 Å, 100 Å, and 300 Å. The test result showed that data discriminator 10 normally operated and produced correct data signal 16.

In this embodiment, an optimum dipulse ratio to provide a largest window margin is also stored in ROM 23. Such recording current control data as to minimize or eliminate a difference between the stored optimum dipulse ratio and a dipulse ratio of an actual reproduced signal corresponding to a calibration signal, is transferred to recording current control circuit 25 via I/0 port 24, from CPU 22. As a result, the recording current is optimized through a feedback control. This optimization of the recording current is carried out before digital information signal 18 is recorded on magnetic recording medium 1. In the feedback control, to decide whether the recording current must be increased or decreased, the recording current is first controlled by a predetermined amount of current, in either of the increase and decrease directions. As the result of this initial control, when a difference between the optimum dipulse ratio stored in ROM 23 and the dipulse ratio of the reproduced signal corresponding to the calibration signal becomes small, the recording current is subsequently controlled in the same direction. When the difference becomes large, the recording current is controlled in the reverse direction.

Figure 5:
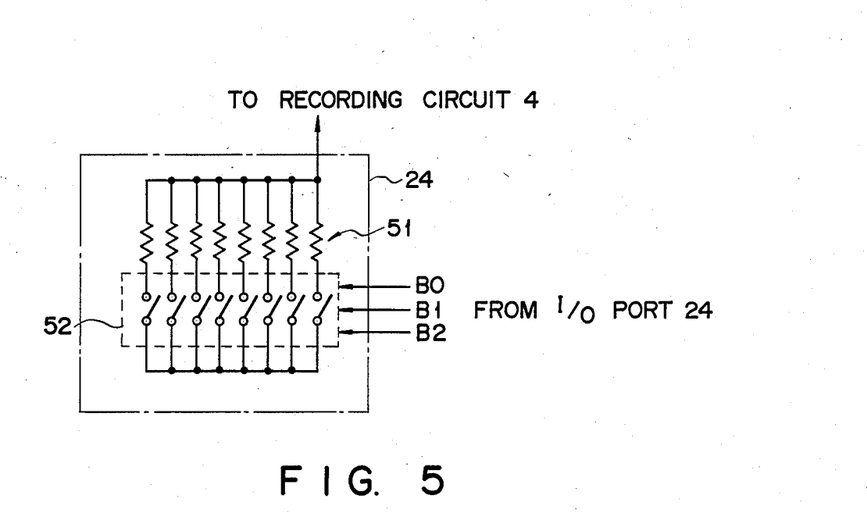
FIG. 5 shows a circuit diagram of a recording current control circuit used in the FIG. 1 circuit.

Recording current control circuit 25 is composed of a plurality (eight in this instance) of recording current determining resistors 51, and analog switch 52 for selecting these resistors 51. The recording current control data as prepared by CPU 22 is supplied in the form of 3-bit parallel data B0, B1 and B2 to analog switch 52, via I/0 port 24. Analog switch 25 select resistors 51 according to the parallel data B0, B1 and B2. The recording current control is preferably performed without damaging an overwrite S/N.

A magnetic recording/reproduction apparatus constructed employing this recording current optimizing method was experimentally operated. In this experiment, two types of magnetic head 2 were used, one having a gap depth of 20 μm and the other having a gap depth of 50 μm. The experimental result showed that data discrimination normally operated, providing a correct recording and reproduction of the information signal.

In the experiment, a recording medium whose magnetic layer is a $Co_{-65}Fe_2O_3$ film of nonorientation was also used. The result of the experiment also showed that the correct recording and reproduction were secured.

The experiment was further conducted using an Mn-Zn ferrite head with a gap length of 0.4 μm and a magnetic recording medium whose magnetic layer is a $Co-\gamma Fe_2O_3$ film with the magnetic property oriented in the longitudinal direction of the film. The correct recording and reproduction were confirmed by the experiment. The same thing was true when the magnetic layer is replaced by a $Co-\gamma Fe_2O_3$ film.

The experiment was also conducted using a metal-in-gap head with a gap length of 0.35 μm and a metal recording medium. The correct recording and reproduction operations were confirmed. After this experiment, the metal recording medium is replaced by a recording medium whose magnetic layer consists of a Co-Cr thin film. The result was the correct recording and reproduction operations.

Figure 6:
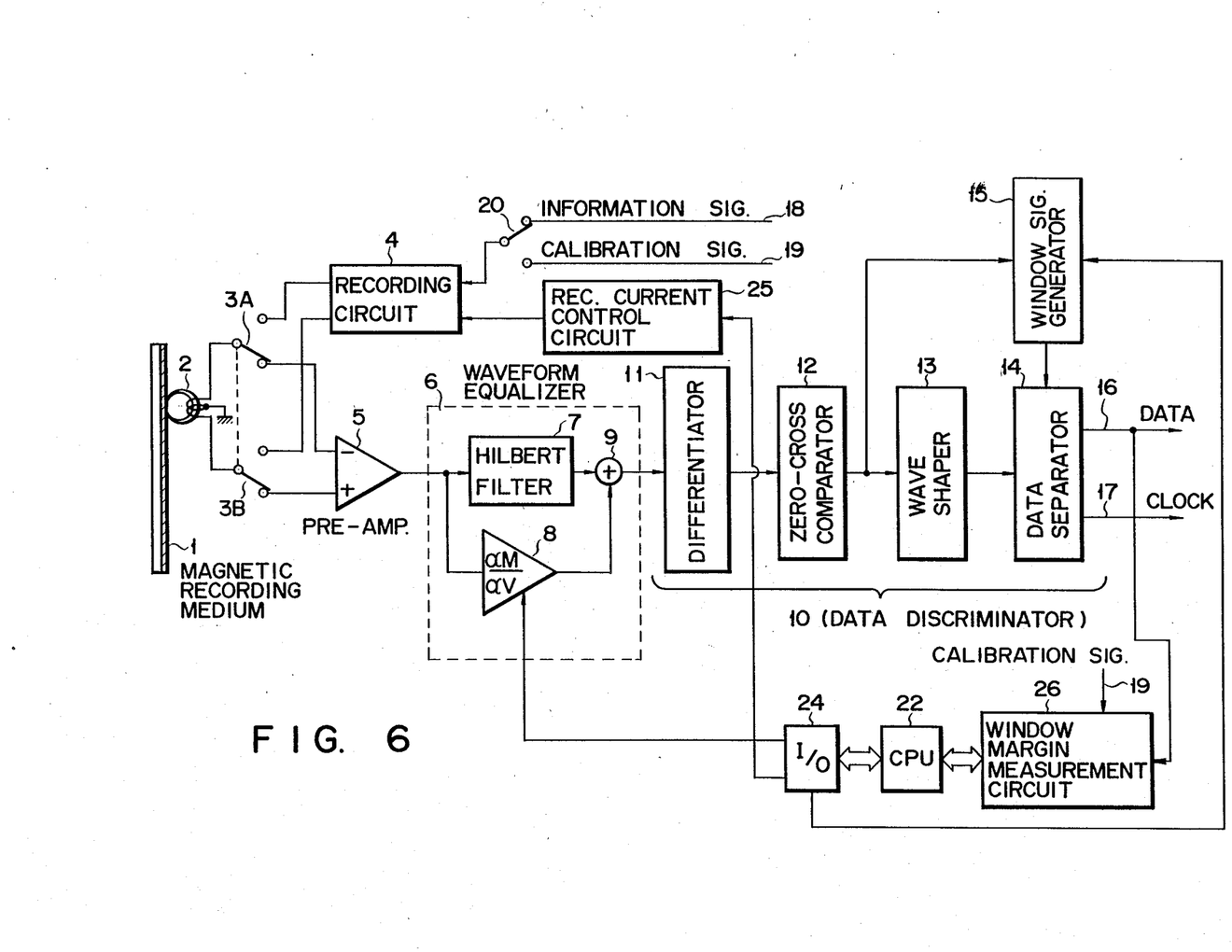
FIG. 6 shows a block diagram of a digital magnetic recording/reproduction apparatus according to a second embodiment of this invention.

FIG. 6 shows another embodiment of this invention. In this embodiment, a data signal as produced from the data separator 14 of data discriminator when a calibration signal is reproduced, is led to window margin measuring circuit 26. In this embodiment, the called worst pattern having the largest peak shift in the reproduced signal is most suitable for the digital pattern of the calibration signal. The MFM (modified frequency modulation) system is most suitable for the recording system for recording the calibration signal. Window margin circuit 26 measures the window margin from data signal 16, by utilizing, for example, the principle of the measurement of phase margin which is disclosed in Tahara et al. *Peak Shift Caused by Gaussian Noise in Digital Magnetic Recording*, in Proceeding of the Japan Electronic Communication Society, Vol. J59-C, No. 10, October 1976, pp. 607–614, particularly "4. Phase Margin, and Error Rate", p. 612. In this embodiment, to measure the window margin, the window signal generated by window signal generator 15 and output through I/0 port 24 under the control of CPU 22 is shifted along the time axis. CPU 22 supplies data signal 16, which represents the shift of the window signal, to window margin circuit 26. Circuit 26 compares data signal 16 with calibration signal 19, thereby determining the error rate of data signal 16. The shift of the window signal along the time axis, which is measured the moment the error rate exceeds a predetermined value, is used as the window margin. The window margin as measured must be maximized. To this end, CPU 22 controls a coefficient in the coefficient multiplier 8 of waveform equalizer 6, through I/0 port 24, and further controls the recording current supplied to magnetic recording head 2 from recording circuit 4.

In the coefficient control of this embodiment, to check the control direction, the coefficient is first controlled by a predetermined amount of coefficient, in either of the increase or decrease directions. As the result of this initial control, when the measured window margin is decreased, the coefficient is subsequently controlled in same direction. When the window margin increases, the coefficient is controlled in the reverse direction. The recording current is also controlled in a similar manner. The control direction is first checked. To this end, the recording current is increased or decreased by a predetermined amount of current. When the measured margin is decreased, the recording current is controlled in the same direction. When it is increased, the recording current is controlled in the reverse direction.

In the first and second embodiments, either the control of the characteristic of waveform equalizer 6 or the recording current control may first be executed. The execution of both the controls is preferable, but if necessary, the execution of one of them is allowed.

It should be understood that this invention may be variously modified and changed within the spirit and the scope of this invention. In the above-mentioned embodiments, waveform equalizer 6 transforms the reproduced signal of the longitudinal/perpendicular composite waveform into the signal consisting of the longitudinal waveform component alone. If necessary, adder 9 may be substituted by a substrator. In this case, the reproduced signal of the longitudinal/perpendicular waveform is transformed into a signal consisting of the perpendicular waveform component alone. Further, the data discriminator must be modified so as to be able to process the perpendicular waveform component.

In the embodiments mentioned above, for controlling the characteristic of waveform equalizer 6, the coefficient of coefficient multiplier 8 is controlled. Alternatively, the transfer characteristic of Hilbert filter 7 may be controlled for the same purposes. Further, the coefficient and the transfer characteristic may both be controlled.

While in the first and second embodiments, the calibration signal is recorded into a track specifically provided for its recording purposes, it may be recorded into a sector region located continuous to the information track.

What is claimed is:

1. A digital magnetic recording/reproduction apparatus for recording and reproducing a digital information signal, comprising:
    means for recording the digital information signal and a calibration signal with a specific digital pattern in a magnetic recording medium, through the same signal path;
    means for reproducing the recorded digital information signal and the recorded calibration signal through the same signal path, and for outputting a reproduced signal;
    means for equalizing a waveform of said reproduced signal;
    data discriminating means for discriminating a data signal from the output signal of said waveform equalizing means, by using a window signal; and
    means for controlling the characteristic of said waveform equalizing means so as to maximize a window margin of said data discriminating means, on the basis of at least one of said reproduced signal and said data signal corresponding to said calibration signal;
    wherein said waveform equalizing means includes a filter means for Hilbert transforming said reproduced signal, a multiplying means for multiplying said reproduced signal by a coefficient provided from said controlling means, and a means for combining the output signal of said multiplying means and the output signal of said filter means.

2. A digital magnetic recording/reproduction apparatus for recording and reproducing a digital information signal, comprising:
    means for recording the digital information signal and a calibration signal with a specific digital pattern in a magnetic recording medium, through the same signal path;
    means for reproducing the recorded digital in formation signal and the recorded calibration signal through the same signal path, and for outputting a reproduced signal;
    means for equalizing a waveform of said reproduced signal;
    data discriminating means for discriminating a data signal from the output signal of said waveform equalizing means, by using a window signal; and
    means for controlling the characteristic of said waveform equalizing means so as to maximize a window margin of said data discriminating means, on the basis of at least one of said reproduced signal and said data signal corresponding to said calibration signal;
    wherein said data discriminating means includes a differentiator for differentiating the output signal of said waveform equalizing means, means for converting the output signal of said differentiator into a binary signal, and a data separator for separating said data signal from the output signal of said the converting means by the window signal.

3. The digital magnetic recording/reproduction apparatus according to claim 1, in which said controlling means controls the characteristic of said waveform equalizing means by controlling said coefficient.

4. The digital magnetic recording/reproduction apparatus according to claim 3, in which said controlling means includes a measuring means for measuring a ratio of the longitudinal waveform component to the perpendicular waveform component, both being the components of the reproduced signal corresponding to said calibration signal, and applies the measured ratio as said coefficient to said multiplying means.

5. The digital magnetic recording/reproduction apparatus according to claim 4, in which said measuring means measures said longitudinal-to-perpendicular waveform component ratio by using a relationship between said longitudinal-to-perpendicular waveform component ratio and a dipulse ratio, and also using a dipulse ratio of said reproduced signal corresponding to said calibration signal.

6. The digital magnetic recording/reproduction apparatus according to claim 1, in which said controlling means measures a window margin of said data discriminating means on the basis of said data signal corresponding to said calibration signal, and controls a characteristic of said waveform equalizing means so as to maximize the measured margin.

7. A digital magnetic recording/reproduction apparatus for recording and reproducing a digital information signal, comprising:
    means for recording the digital information signal and a calibration signal with a specific digital pattern in a magnetic recording medium, through the same signal path;
    means for reproducing the recorded digital information signal and the recorded calibration signal through the same signal path, and for outputting a reproduced signal;
    means for equalizing a waveform of said reproduced signal;

data discriminating means for discriminating a data signal from the output signal of said waveform equalizing means, by using a window signal; and means for controlling the recording current of said recording means so as to maximize a window margin of said data discriminating means, on the basis of at least one of said reproduced signal and said data signal corresponding to said calibration signal;

wherein said controlling means controls said recording current so as to minimize a difference between a prestored dipulse ratio providing a maximum window margin, and a dipulse ratio of said reproduced signal corresponding to said calibration signal.

8. A digital magnetic recording/reproduction apparatus for recording and reproducing a digital information signal, comprising:

means for recording the digital information signal and a calibration signal with a specific digital pattern in a magnetic recording medium, through the same signal path;

means for reproducing the recorded digital information signal and the recorded calibration signal through the same signal path, and for outputting a reproduced signal;

means for equalizing a waveform of said reproduced signal;

data discriminating means for discriminating a data signal from the output signal of said waveform equalizing means, by using a window signal; and means for controlling the recording current of said recording means so as to maximize a window margin of said data discriminating means, on the basis of at least one of said reproduced signal and said data signal corresponding to said calibration signal;

wherein said controlling means measures a window margin of said data discriminating means on the basis of said data signal corresponding to said calibration signal, and controls said recording current so as to maximize the measured margin.

9. A digital magnetic recording/reproduction method for recording and reproducing a digital information signal, comprising the steps of:

recording the digital information signal and a calibration signal with a specific digital pattern in a magnetic recording medium, through the same signal path;

reproducing the recorded digital information signal and the recorded calibration signal through the same signal path, and outputting a reproduced signal;

equalizing a waveform of said reproduced signal by a waveform equalizing means;

data discriminating a data signal from the output signal of said waveform equalizing means, by using a window signal; and controlling the characteristic of said waveform equalizing means, on the basis of at least one of said reproduced signal and said data signal corresponding to said calibration signal, before said digital information signal is reproduced;

wherein said controlling step includes a step of measuring a ratio of the longitudinal waveform component to the perpendicular waveform components as contained in the reproduced signal corresponding to said calibration signal, and controls the characteristic of said waveform equalizing means.

10. A digital magnetic recording/reproduction method for recording and reproducing a digital information signal, comprising the steps of:

recording the digital information signal and a calibration signal with a specific digital pattern in a magnetic recording medium, through the same signal path;

reproducing the recorded digital information signal and the recorded calibration signal through the same signal path, and outputting a reproduced signal;

equalizing a waveform of said reproduced signal by a waveform equalizing means;

data discriminating a data signal from the output signal of said waveform equalizing means, by using a window signal; and controlling the characteristic of said waveform equalizing means, on the basis of at least one of said reproduced signal and said data signal corresponding to said calibration signal, before said digital information signal is reproduced;

wherein said controlling step measures a window margin of said data discriminating step on the basis of said data signal corresponding to said calibration signal, and controls a characteristic of said waveform equalizing means so as to maximize the measured margin.

11. A digital magnetic recording/reproduction method for recording and reproducing a digital information signal, comprising the steps of:

recording the digital information signal and a calibration signal with a specific digital pattern in a magnetic recording medium, through the same signal path;

reproducing the recorded digital information signal and the recorded calibration signal through the same signal path, and outputting a reproduced signal;

equalizing a waveform of said reproduced signal by a waveform equalizing means;

data discriminating a data signal from the output signal of said waveform equalizing means, by using a window signal; and controlling the recording current used in said recording step so as to maximize a window margin for said data discriminating step, on the basis of at least one of said reproduced signal and said data signal corresponding to said calibration signal, before said digital information signal is recorded;

wherein said controlling step controls said recording current so as to minimize a difference between a prestored dipulse ratio providing a maximum window margin, and a dipulse ratio of said reproduced signal corresponding to said calibration signal.

12. The digital magnetic recording/reproduction method according to claim 11, in which said controlling step includes a step of deciding whether said recording current must be increased or decreased, on the basis of variation of said difference corresponding to variation of said recording current.

13. A digital magnetic recording/reproduction method for recording and reproducing a digital information signal, comprising the steps of:

recording the digital information signal and a calibration signal with a specific digital pattern in a magnetic recording medium, through the same signal path;

reproducing the recorded digital information signal and the recorded calibration signal through the same signal path, and outputting a reproduced signal;

equalizing a waveform of said reproduced signal by a waveform equalizing means;

data discriminating a data signal from the output signal of said waveform equalizing means, by using a window signal; and controlling the recording current used in said recording step so as to maximize a window margin for said data discriminating step, on the basis of at least one of said reproduced signal and said data signal corresponding to said calibration signal, before said digital information signal is recorded;

wherein said controlling step measures a window margin of said data discriminating step on the basis of said data signal corresponding to said calibration signal, and controls said recording current so as to maximize the measured margin.

14. The digital magnetic recording/reproduction method according to claim 13, in which said controlling step includes a step of deciding whether said recording current must be increased or decreased, on the basis of variation of the measured margin corresponding to variation of said recording current.

* * * * *